C. S. G. NICHOLS.
FLEXIBLE PUNCTURE PROOF MATERIAL.
APPLICATION FILED JULY 18, 1917.
1,284,429.
Patented Nov. 12, 1918.
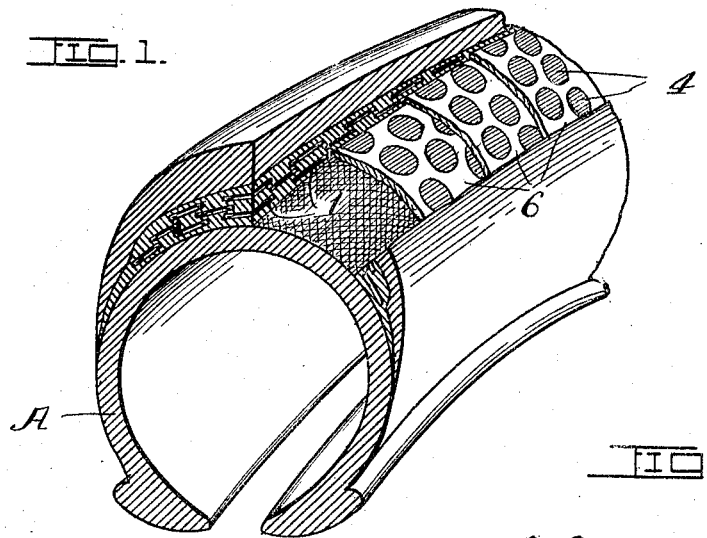
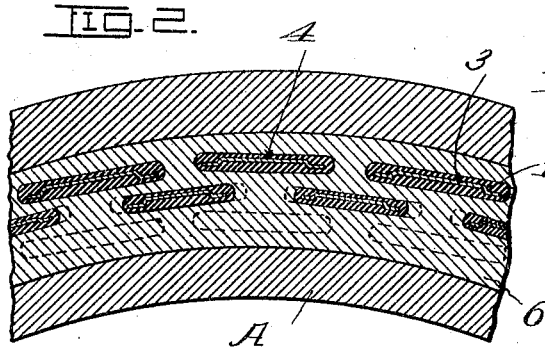
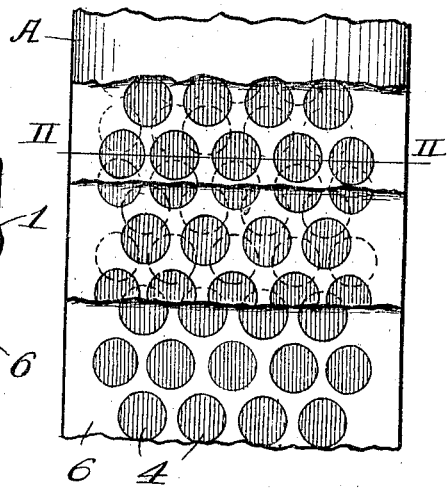
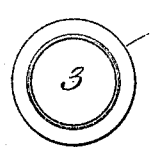
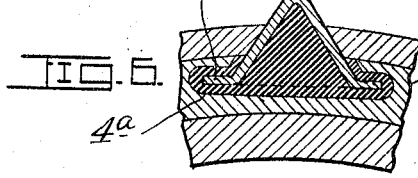
INVENTOR:
Charles S. G. Nichols,
BY
F. G. Fischer,
ATTORNEY.
Witness:
R. Hamilton

UNITED STATES PATENT OFFICE.

CHARLES S. G. NICHOLS, OF KANSAS CITY, MISSOURI.

FLEXIBLE PUNCTURE-PROOF MATERIAL.

1,284,429.

Specification of Letters Patent.

Patented Nov. 12, 1918.

Application filed July 19, 1917. Serial No. 181,241.

*To all whom it may concern:*

Be it known that I, CHARLES S. G. NICHOLS, a citizen of the United States, residing at Kansas City, in the county of Jackson and State of Missouri, have invented certain new and useful Improvements in Flexible Puncture-Proof Materials, of which the following is a specification.

My invention relates to puncture proof material, and my object is to provide a new article of manufacture which may be employed to advantage in the construction of pneumatic tires, bullet proof garments, etc.

In carrying out my invention, I take metallic plates of suitable size and shape and incorporate each in an individual coating of soft rubber. The plates thus coated are spaced apart, arranged in overlapping relation to each other, and embedded in a sheet of soft rubber of suitable thickness. The rubber is then vulcanized to incorporate the whole into one structure, which is rendered puncture proof by the metallic plates and at the same time possesses a certain amount of resiliency due to the rubber cushion which forms the greater portion of such structure. As the rubber coatings of the metallic plates contain more sulfur than the outer surrounding rubber sheet, such coatings become exceedingly hard during the vulcanizing process and thus protect the surrounding softer rubber from becoming damaged by the comparatively sharp edges of the plates. The primary coatings also present a better surface than the metallic plates for the surrounding rubber to adhere to, and become thoroughly incorporated in said surrounding rubber during the vulcanizing process.

In order that the invention may be fully understood, reference will now be made to the accompanying drawing, in which:

Figure 1 is a broken, perspective view of a pneumatic tire incorporating the puncture proof material.

Fig. 2 is an enlarged, broken cross sectional view on line II—II of Fig. 3.

Fig. 3 is a broken plan view, showing the manner in which the metal plates overlap to protect the material from being punctured.

Fig. 4 is a detail plan view of a metal plate of circular configuration.

Fig. 5 is a detail of a metal plate of rectangular formation.

Fig. 6 is a broken, sectional view of a modified form of material for deflecting bullets.

In carrying out the invention, I employ a plurality of metallic plates 1, which may be either circular, rectangular, or of other suitable configuration. Each plate has a raised portion 3, to increase its rigidity and overcome any tendency for it to shift about in its rubber coating 4.

The rubber coated plates are embedded in a sheet of soft rubber, 6, care being taken to space the plates apart and have them overlap, so as not to leave an opening for the passage of a nail, or other puncturing element. The whole is then vulcanized, so that said rubber sheet 6 and the rubber coatings 4 firmly adhere to each other. In this way each plate is firmly and separately anchored and possibility of friction between the individual plates is obviated. At the same time the structure is flexible and permits the necessary resiliency when incorporated in a pneumatic tire A. Flexibility of the material also permits comparative freedom of movement of the wearer when the material is formed into a bullet-proof garment. When incorporated in a pneumatic tire the metallic plates 1 not only protect the inner tube against puncture, but also guard the carcass of the tire against stone bruises, which in many instances result in blowouts.

Additional sulfur in the rubber coatings 4, renders such coatings exceedingly hard in the vulcanizing process, so that they not only reinforce the metallic plates 1, but prevent the same from shifting about and cutting the comparatively soft rubber cushion 6.

While I have specified that the metallic plates 1 are coated with soft rubber 4, containing sufficient sulfur to render them very hard after being vulcanized, I do not limit myself to such material but reserve the right to use gutta-percha or other suitable materials capable of becoming hard and protecting the surrounding cushion from becoming damaged by the metallic plates. The surrounding cushion may also consist of other material than the soft rubber 6.

When the material (Fig. 6) is made up in the form of a garment the raised portions 3ª of the plates 1ª, are prominent and protrude beyond the rubber sheet or cushion 6ª, to protect the latter from damage by bullets fired against the garment.

From the foregoing description, it is apparent that I have produced a puncture and bullet proof material possessing the advantages above enumerated and well adapted for the purpose intended.

Having thus described my invention, what I claim and desire to secure by Letters Patent, is:

1. A material of the character described, consisting of a plurality of plates spaced apart and arranged in overlapping relation to each other, a separate coating of relatively hard material completely covering each plate, and a cushion in which the coated plates are embedded.

2. A material of the character described, consisting of a plurality of metallic plates spaced apart and arranged in overlapping relation to each other, hard material in which each plate is completely embedded, and relatively soft material in which said hard material is embedded.

3. A structure of the character described, consisting of a plurality of metallic plates spaced apart and arranged in overlapping relation to each other, a hard rubber coating for each plate, and relatively soft material in which said hard rubber coatings are embedded.

4. A structure of the character described, consisting of a plurality of metallic plates, hard rubber coatings incasing said metallic plates, spaced apart and overlapping each other, and a relatively soft rubber cushion in which said hard rubber coatings are incorporated.

5. A material of the character described, consisting of a plurality of plates arranged in overlapping relation to each other and each having entirely within its margin a raised stiffening portion, a coating for each plate of relatively rigid material, and a cushion in which the coated plates are inclosed.

In testimony whereof I affix my signature, in the presence of two witnesses.

CHARLES S. G. NICHOLS.

Witnesses:
F. G. FISCHER,
L. J. FISCHER.

Copies of this patent may be obtained for five cents each, by addressing the "Commissioner of Patents, Washington, D. C."